(12) United States Patent
Funakoshi et al.

(10) Patent No.: US 6,974,944 B2
(45) Date of Patent: Dec. 13, 2005

(54) CMOS IMAGE SENSOR PERMITTING INCREASED LIGHT SENSITIVITY FROM AMPLIFICATION OF PIXEL DETECTION SIGNALS

(75) Inventors: Jun Funakoshi, Kawasaki (JP);
Katsuyoshi Yamamoto, Kawasaki (JP);
Toshitaka Mizuguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 211 days.

(21) Appl. No.: 10/360,635

(22) Filed: Feb. 10, 2003

(65) Prior Publication Data
US 2005/0072901 A1    Apr. 7, 2005

(30) Foreign Application Priority Data
Feb. 28, 2002  (JP) ............... 2002-052674

(51) Int. Cl.[7] ............................................. H01J 40/14
(52) U.S. Cl. .................. 250/214 A; 348/301
(58) Field of Search .. 250/208.1, 214 A; 348/300–302

(56) References Cited

U.S. PATENT DOCUMENTS 6,310,571 B1 * 10/2001 Yang et al. .................. 341/155
6,717,616 B1 *  4/2004 Afghahi et al. ............. 348/300

* cited by examiner

*Primary Examiner*—Thanh X. Luu
(74) *Attorney, Agent, or Firm*—Arent Fox PLLC

(57) ABSTRACT

An image sensor, includes: a plurality of pixel circuits, each of which comprises a photoelectric conversion element, a first transistor controlled by a detection signal generated by the photoelectric conversion element, and a second transistor connected to the first transistor and controlled by a select line; and a common amplifier circuit, which is provided commonly to the plurality of pixel circuits, and which has a third transistor connected in parallel to the first transistor, and a current circuit for supplying current to the first and third transistors, wherein an amplifying circuit, which amplifies the detection signal, is formed by the first transistor in a pixel circuit selected by the select line, and by the third transistor in th common amplifier circuit.

7 Claims, 6 Drawing Sheets

OVERALL CONFIGURATION OF TYPICAL CMOS IMAGE SENSOR

CONVENTIONAL CMOS IMAGE SENSOR

CMOS IMAGE SENSOR PERMITTING INCREASED LIGHT SENSITIVITY FROM AMPLIFICATION OF PIXEL DETECTION SIGNALS

CROSS-REFERENCE TO RELATED APPLICATIONS

This application is based upon and claims the benefit of priority from the prior Japanese Patent Application No. 2002-52674, filed on Feb. 28, 2002, the entire contents of which are incorporated herein by reference.

BACKGROUND OF THE INVENTION

1. Field of the Invention

The present invention relates to a CMOS image sensor, and more particularly to a CMOS image sensor that permits an increase in light sensitivity through amplification of pixel detection signals, without an accompanying enlargement of circuit devices.

2. Description of the Related Art

CMOS image sensors have attracted attention as low cost image sensors. CMOS image sensors can be manufactured by means of an ordinary CMOS process, are characterized by low power consumption, low voltages and a low cost, and have been adopted in inexpensive digital cameras and the like in place of CCD sensors.

FIG. 1 shows the overall configuration of a typical CMOS image sensor. This image sensor comprises a pixel array 10 in which pixels having a photoelectric conversion circuit are arranged in the form of a matrix; a row select circuit 12 for selecting pixels oriented in the row direction; a sample-and-hold circuit SH for holding pixel signals outputted from selected pixels to column lines; and a column select circuit 14 for selecting pixel signals held by the sample-and-hold circuit SH and outputting these signals to an output line 16. Further, analog pixel signals outputted to the output line 16 are amplified by an amplifying circuit 20 and then converted to digital pixel signals (to pixel data) by an A/D conversion circuit 22.

FIG. 2 is a part detail circuit diagram of a conventional CMOS image sensor. An in-pixel photoelectric conversion circuit, and sample-and-hold circuits for each column are illustrated in this figure. Also, pixels P00 to P11, which form two rows and two columns, are shown, the in-pixel photoelectric conversion circuit being shown only for pixel P00.

The in-pixel photoelectric conversion circuit is provided with a photodiode PD, which is a photoelectric conversion element, a reset transistor N1, an amplifier transistor N2, and a select transistor N3. The row select circuit 12 drives the reset line RST such that the reset transistor N1 conducts, whereby the node npd connected to the photodiode PD is pre-charged to a reset voltage VRST level. When the reset transistor N1 is non-conductive, a current corresponding to the amount of light received is generated by the photodiode PD and the potential of the node npd drops in accordance with this current. The voltage drop of the node npd corresponds to the pixel signal. Further, when, after a fixed duration during which light is received, the row select circuit 12 drives a row line ROW0 such that the select transistor N3 is caused to conduct, the pixel signal, which is amplified by the transistor N2, is outputted to a column line CL0. A current source transistor N4 is connected to the column line CL0.

Sample-and-hold circuits SH0, SH1 are connected to column lines CL0, CL1 respectively and temporarily hold pixel signals which have been detected by pixels and then amplified. The sample-and-hold circuits SH0, SH1 illustrated constitute examples of CDS (Correlated Double Sampling) circuits. The CDS circuits comprise a capacitor Csh for holding analog image signals outputted to column lines CL1, CL2, analog amplifying circuits 30, 34 being provided before and after the respective capacitor Csh respectively. Operation of these CDS circuits will be described hereinafter.

In a conventional CMOS image sensor, the node npd signal, which corresponds to the image signal in the pixel, is amplified by the source follower transistor N2 and then held by a sample-and-hold circuit SH. A source follower circuit can only output a signal amplitude on the order of 0.8 times the signal amplitude of the detection node npd to the source terminal, and does not have an adequate amplification capacity. Consequently, as shown in FIG. 1, an amplifying circuit 20 is provided outside the pixel array and amplifies detected pixel signals. However, because signals which have been photoelectrically converted by the pixels are not amplified directly, such signals comprise noise and the like, which precludes outputting of image signals with sufficient sensitivity.

Meanwhile, consideration has been given to the provision of an amplifying circuit as an enhancement to an in-pixel circuit. However, when such an amplifying circuit is provided within a pixel, the number of devices in the pixel increases such that the numerical aperture of the image sensor (=the area of the photodiode÷pixel area) falls, which is disadvantageous.

SUMMARY OF THE INVENTION

Thus, it is an object of the present invention to provide an image sensor permitting higher sensitivity.

In order to achieve the above object, one aspect of the present invention is an image sensor, comprising: a plurality of pixel circuits, each of which comprises a photoelectric conversion element, a first transistor controlled by a detection signal generated by the photoelectric conversion element, and a second transistor connected to the first transistor and controlled by a select line; and a common amplifier circuit, which is provided commonly to the plurality of pixel circuits, and which has a third transistor connected in parallel to the first transistor, and a current circuit for supplying current to the first and third transistors, wherein an amplifying circuit, which amplifies the detection signal, is formed by the first transistor in a pixel circuit selected by the select line, and by the third transistor in the common amplifier circuit.

According to the above-described aspect of the present invention, an amplifying circuit is formed by a first transistor, which is in a pixel circuit and controlled by a detection signal; and a third transistor, which is in a common amplifier circuit that is provided commonly to a plurality of pixel circuits, such that in-pixel detection signals can be directly amplified by this amplifying circuit. Accordingly, amplified detection signals that do not contain noise can be generated. Moreover, the internal configuration of the pixel circuits can be limited to having the same number of elements as do conventional examples, meaning that there is also no reduction in the numerical aperture.

In a preferred embodiment of the invention described above, the output of the above-described amplifying circuit is connected to a sample-and-hold circuit via a second amplifying circuit the gain of which can be controlled. The gain of this second amplifying circuit can be controlled in accordance with the luminosity of a detected image.

Further, in another preferred embodiment of the invention described above, the output of the above-described amplifying circuit formed by the first and third transistors can be fed back negatively to the gate of the third transistor via a variable resistor. The gain of this amplifying circuit can be controlled by varying this variable resistor.

DESCRIPTION OF THE PREFERRED EMBODIMENTS

Figure 1:
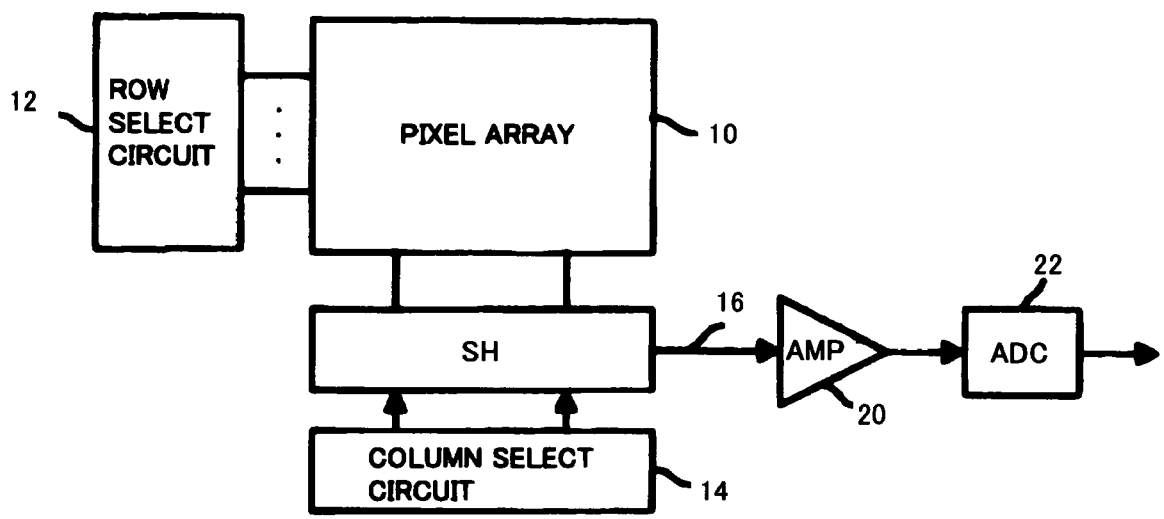
FIG. 1 shows the overall configuration of a typical CMOS image sensor.

Embodiments of the present invention will be described hereinbelow, referring to the drawings. Nevertheless, the scope of protection of the present invention is not limited to or by the embodiments below but rather is intended to cover the inventions defined in the claims as well as any equivalents thereof.

Figure 3:
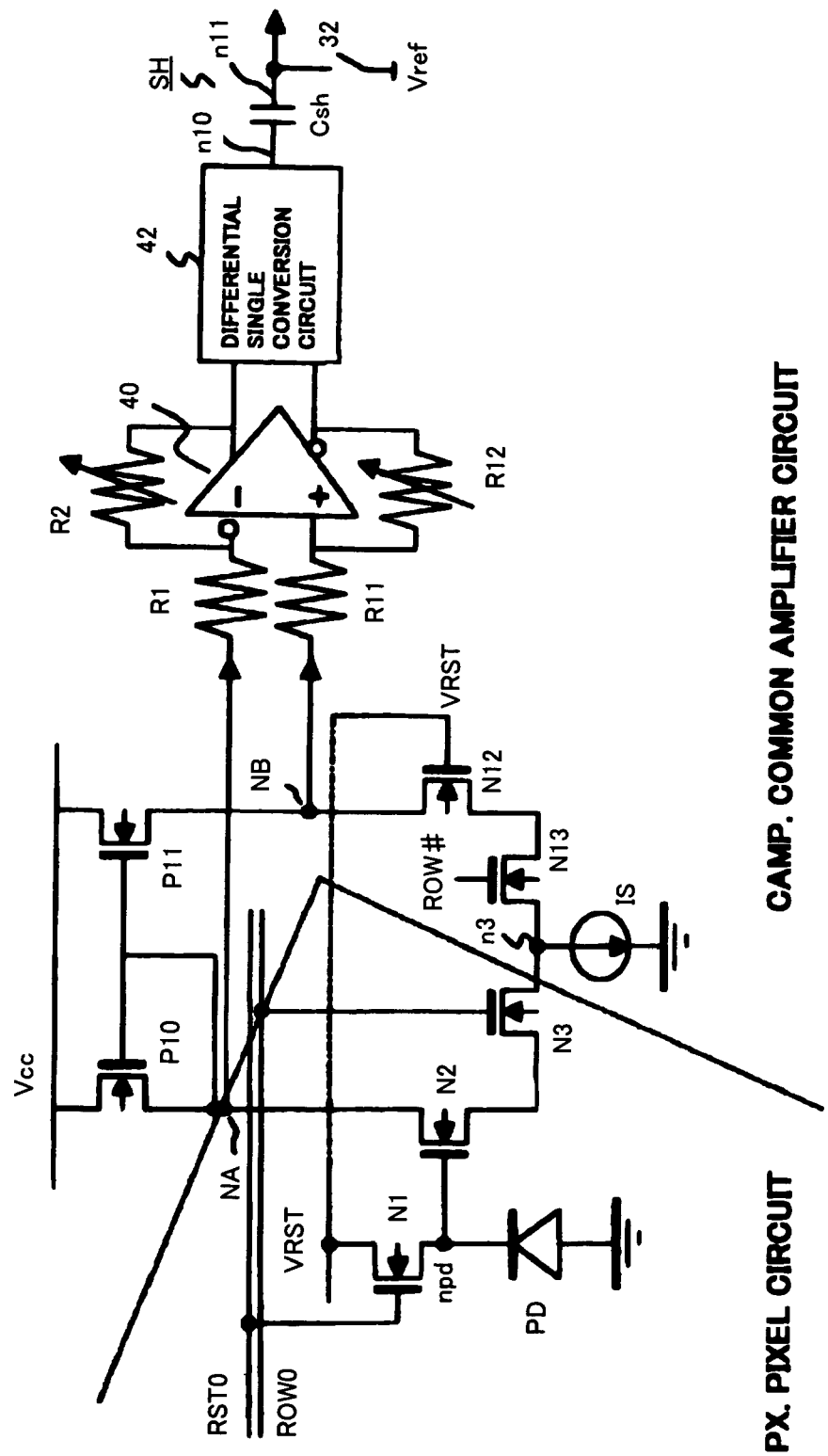
FIG. 3 is a circuit diagram showing a pixel circuit and the common amplifier circuit, according to a first embodiment.

FIG. 3 is a circuit diagram showing a pixel circuit and the common amplifier circuit, according to the first embodiment. One pixel circuit PX is shown in FIG. 3, the circuit configuration thereof being substantially the same as that for conventional examples. That is, the pixel circuit PX comprises: a photodiode PD, which is a photoelectric conversion element; a reset transistor N1, to the gate of which a reset signal RST0 is supplied, and which conducts when the reset signal RST0 is supplied thereto to thereby reset the detection node npd to a reset voltage VRST; a transistor N2 whose gate is connected to the detection node npd; and a select transistor N3 controlled by a row select line ROW0.

However, the drain terminal of the transistor N2 in the pixel circuit PX is connected to a current mirror circuit (formed by P10, P11) within a common amplifier circuit Camp. Further, the source terminal of the select transistor N3 is connected to a current source Is in the common amplifier circuit Camp. A plurality of pixel circuits PX is connected in parallel to the common amplifier circuit Camp. The constitution thereof is described hereinbelow.

Meanwhile, the common amplifier circuit Camp comprises transistors N12, N13 connected in parallel to the transistors N2, N3 in the pixel circuit; P channel transistors P10, P11 that constitute a current mirror circuit connected to a power supply Vcc; and a current source Is. The reset voltage VRST is connected to the gate of the transistor N12, and a select signal ROW#, which corresponds to an OR operation for all the row select lines, is applied to the gate of the transistor N13.

Now, supposing that when the row select line ROW0 goes High such that the select transistor N3 in the pixel circuit conducts, and, at the same time, the select signal ROW# goes High such that the transistor N13 in the common amplifier circuit conducts, an amplifying circuit is formed by: the pair of input transistors N2, N12; the current mirror circuit comprising the transistors P10, P11; and the current source Is. Further, of the pair of input transistors N2, N12, a photoelectrically converted detection signal npd is inputted to the gate of the pixel circuit transistor N2, and the reset voltage VRST is inputted to the gate of the transistor N12 of the common amplifier circuit. Accordingly, a voltage, or current, which corresponds to the difference between the detection signal npd and the reset voltage VRST, is outputted to the drain terminals NA, NB of the transistors N2, N12 respectively. In other words, the detection signal npd detected by the photoelectric conversion element PD is directly differential-amplified by the amplifying circuit and outputted to the drain terminals NA, NB of the transistors N2, N12 respectively.

This single pair of output terminals NA, NB are inputted to a differential amplifier circuit 40 via resistors R1, R11 respectively. The differential amplifier 40 is provided with negative feedback resistors R2, R12 which are variable and lie between the differential outputs and differential inputs. Varying the resistance values of these negative feedback resistors R2, R12 permits the gain of the differential amplifier 40 to be controlled. The differential outputs of the differential amplifier circuit 40 are supplied to a differential single conversion circuit 42, the single output of which corresponds to the difference between the differential inputs that are supplied to the sample-and-hold circuit SH. The sample-and-hold circuit SH comprises a sample-and-hold capacitor Csh and a reset switch 32, similarly to conventional examples.

Figure 4:
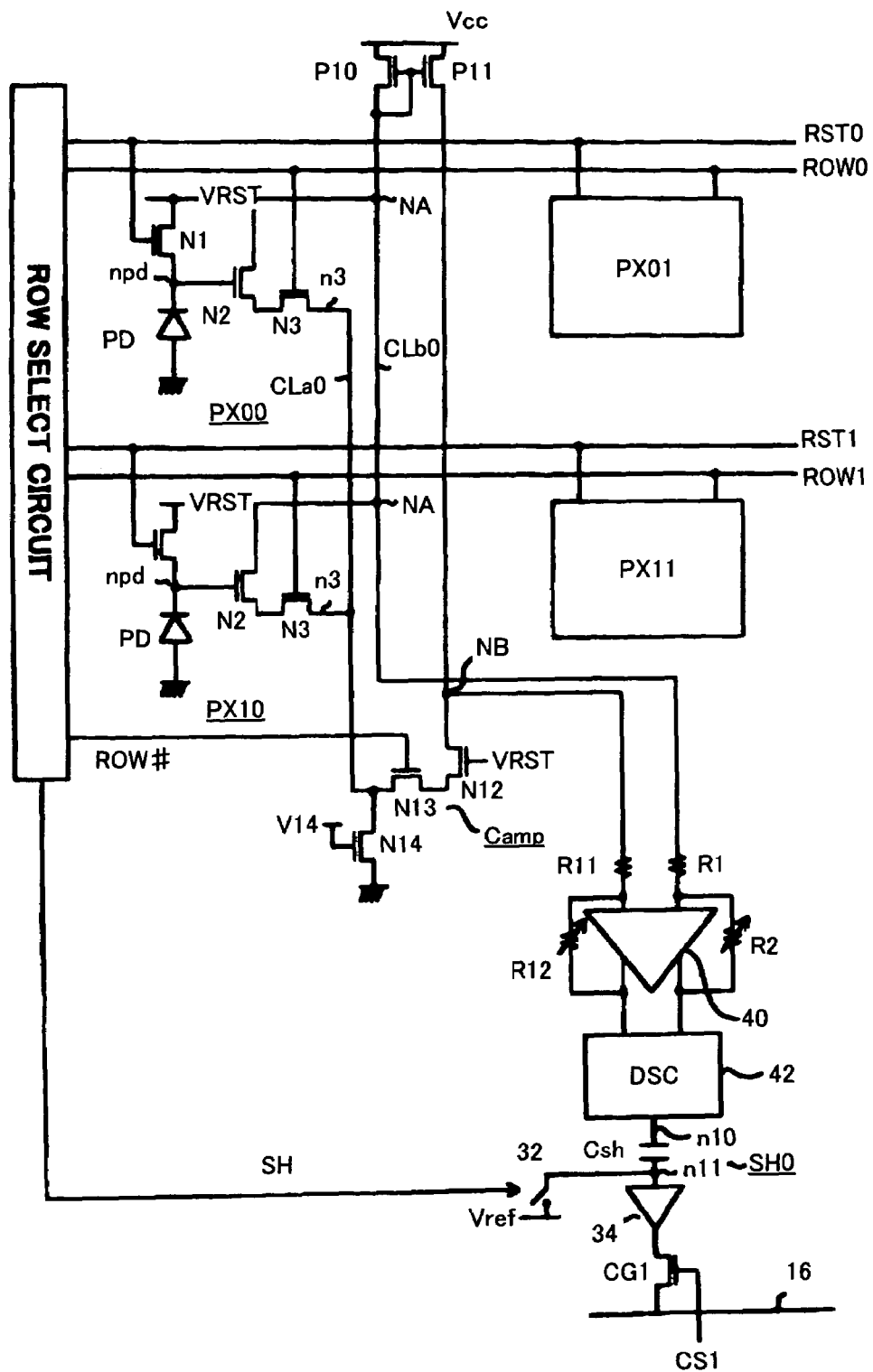
FIG. 4 is a circuit diagram showing pixel circuits forming a matrix, and the common amplifier circuit thereof.

FIG. 4 is a circuit diagram showing pixel circuits forming a matrix, and the common amplifier circuit thereof. FIG. 4 shows pixel circuits PX00 to PX11 of two rows and two columns, and the common amplifier circuit Camp provided so as to be common to the two pixel circuits PX00 and PX10 in the column direction. The common amplifier circuit of the pixel circuits PX01 and PX11 of the second column has been omitted from the illustration.

As also shown in FIG. 3, nodes NA, n3 in the plurality of pixel circuits PX are connected in parallel to the common amplifier circuit Camp. Thus, respective nodes n3 of the pixel circuits are connected to a first column line CLa0, and respective nodes NA of the pixel circuits are connected to a second column line CLb0. Accordingly, in the column direction of the pixel array, first and second column lines CLa, CLb are provided, and in the row direction of the pixel array, reset lines RST0, RST1 and row select lines ROW0, ROW1 are provided as in conventional examples. In addition, the transistor N13 in the common amplifier circuit Camp is supplied with a drive signal line ROW# in accordance with the OR operation for the row select lines ROW0, ROW1. In other words, when either of the row select lines is driven, this transistor N13 is also driven. This drive signal line ROW# is also supplied to the common amplifier circuit of the second column (not illustrated).

As shown in FIG. 4, because the configuration of the pixel circuits comprises, in addition to the photoelectric conversion element PD: the reset transistor N1, the transistor N2, which is controlled by the detection node npd, and the select transistor N3, which is controlled by a row select signal ROW, the number of elements is the same as that for conventional examples. Also, a common amplifier circuit Camp is provided so as to be common to the plurality of pixel circuits PX provided in each column. Thus, similarly to conventional examples, a common amplifier circuit Camp is only added for each column.

Furthermore, the pixel circuits belonging to a selected row are connected to the respective common amplifier circuit Camp of each column via respective transistors N3, thereby forming the amplifying circuit shown in FIG. 3. This amplifying circuit compares the detection signal npd, which is generated by the photodiode PD constituting the photoelectric conversion element, with the reset voltage VRST, to thereby generate the amplified outputs NA, NB. Thus, the detection signal npd, which contains very little noise, is amplified directly, thereby permitting an increase in the sensitivity of the sensor.

Figure 5:
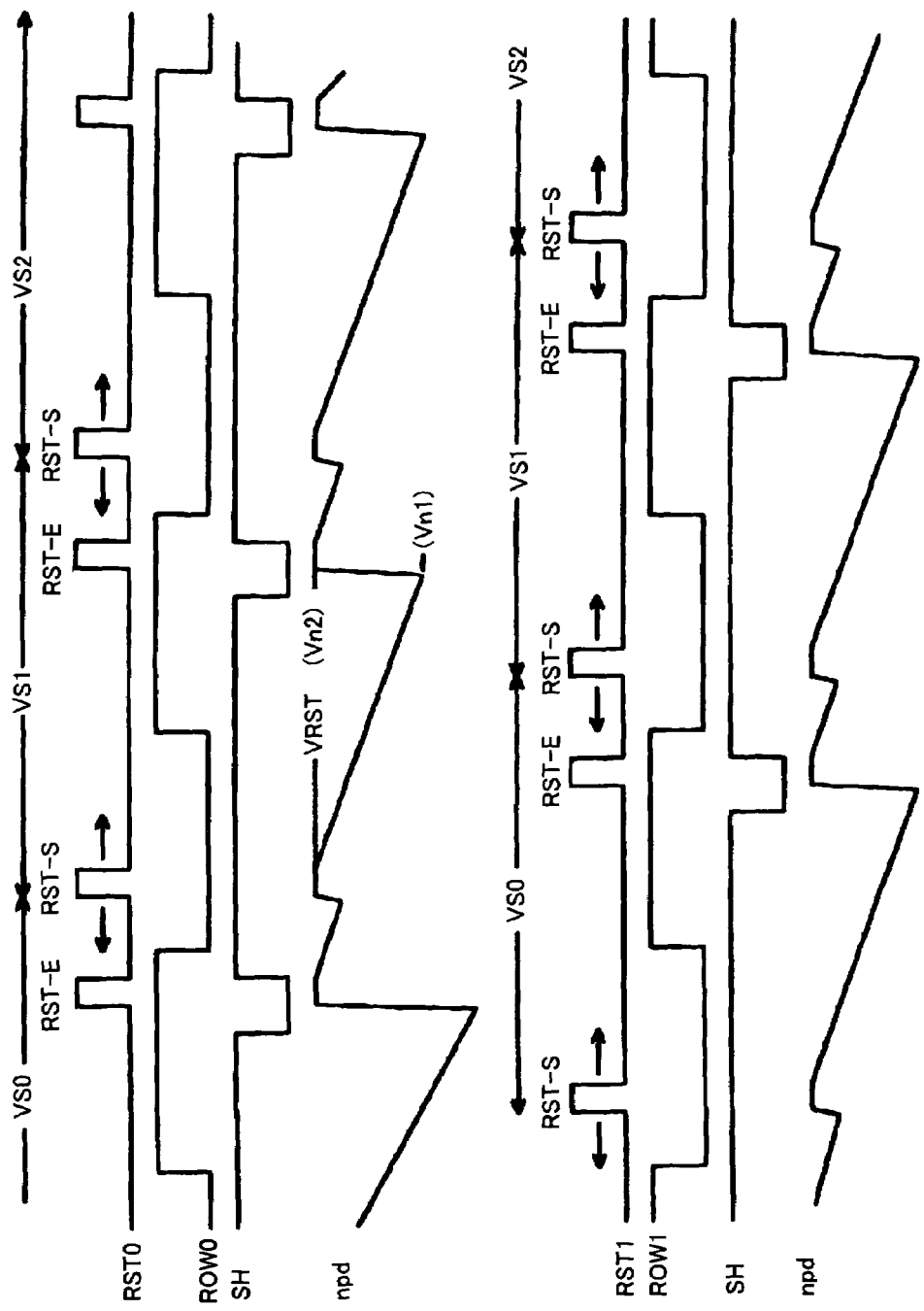
FIG. 5 is a waveform diagram for the operation of the image sensor.

FIG. 5 is a waveform diagram for the operation of the image sensor in FIG. 4. The reset signal RST0, row select line ROW0 and in-pixel detection signal npd, which pertain to the first row, and the reset signal RST1, row select line ROW1 and in-pixel detection signal npd, which pertain to the second row, are illustrated. The sample-and-hold control signal SH is illustrated in a first line and a second line to facilitate understanding but this is actually the same signal. Also illustrated in FIG. 5 are: vertical sync cycles VS0, VS1, VS2 for pixel circuits of the first row, and vertical sync cycles VS0, VS1, VS2 for pixel circuits of the second row. As illustrated, the vertical sync cycles of each row are shifted with respect to one another.

If the operation is described by focusing on the pixels of the first row, the reset signal RST0 has an image pickup start pulse RST-S and an image pickup end pulse RST-E which are generated at the start and end of a vertical sync cycle respectively. When the image pickup start pulse RST-S is applied, the reset transistor N1 conducts and the detection node npd is then set to the reset voltage VRST. At such time, the switch 32 of the sample-and-hold circuit SH0 is closed. The pixel area photoelectric conversion element PD generates a current that corresponds to the amount of light received, to thereby reduce the potential of the detection node npd.

When the image pickup cycle ends, the row select line ROW0 is High such that the pixel circuits PX and the common amplifier circuit Camp form an amplifying circuit. Also, as a result of the potential drop of the detection node npd, the first input transistor N2 of the amplifying circuit assumes a more non-conductive state and the second input transistor N12 assumes a more conductive state. As a result, a larger current is outputted via the output NA, whereas a comparatively smaller current is outputted via output NB. If this is described in terms of potential, the output NA is then at a higher potential and the output NB is at a lower potential. The differential outputs NA, NB are amplified by the gain control amplifier circuit 40, with the result that the potential of the node n10, which is the input to the sample-and-hold circuit, changes. This change in potential is held by the sample-and-hold capacitor Csh.

The voltage Vn1 of the input n10 of the sample-and-hold circuit at the time the image pickup cycle ends is stored in the capacitor Csh, that is, charge corresponding to the voltage Vn1−Vref is stored in the capacitor Csh.

In this state, the switch 32 is opened and the node n11 assumes a floating state. Also, when the image pickup end pulse RST-E is applied as a reset signal, the detection node npd is reset and returns to the reset voltage VRST. In accordance with the voltage Vn2 of the input node n10 of the sample-and-hold circuit at this time, the voltage of the node n11 at the other end of the capacitor is then:

$$(Vn1-Vref)-Vn2=(Vn1-Vn2)-Vref,$$

and the difference in the voltage before and after the end reset pulse RST-E (difference Vn1−Vn2) is contained in the voltage of the output node n11 of the sample-and-hold circuit SH. As a result, a signal that corresponds to the intensity of light received in the course of the image pickup cycle, that is, a signal for which the noise contained has been offset, is outputted from the sample-and-hold circuit.

Thereafter, the image pickup start reset pulse RST-S is generated in the reset line RST for the next image pickup cycle, thereby restoring the detection node npd in the pixel circuit to the reset voltage VRST once again. Subsequent operation involves repetition of the above.

Operation with respect to the pixels in the second row is the same as the operation for the first row. However, because the common amplifier circuit Camp and the column lines CLa and CLb are shared, timing for the pulse signal of the reset line RST1 and for the signal of the row select line ROW1 lags behind the timing for RST0 and ROW0 of the first row.

The timing for the generation of the above image pickup start reset pulse RST-S can be shifted laterally to enable an extension or shortening of the image pickup cycle. Accordingly, when a brighter image is picked up, the timing for the generation of the image pickup start reset pulse RST-S is delayed, and when a darker image is picked up, timing can be made earlier, whereby an optimum output can be obtained.

Figure 2:
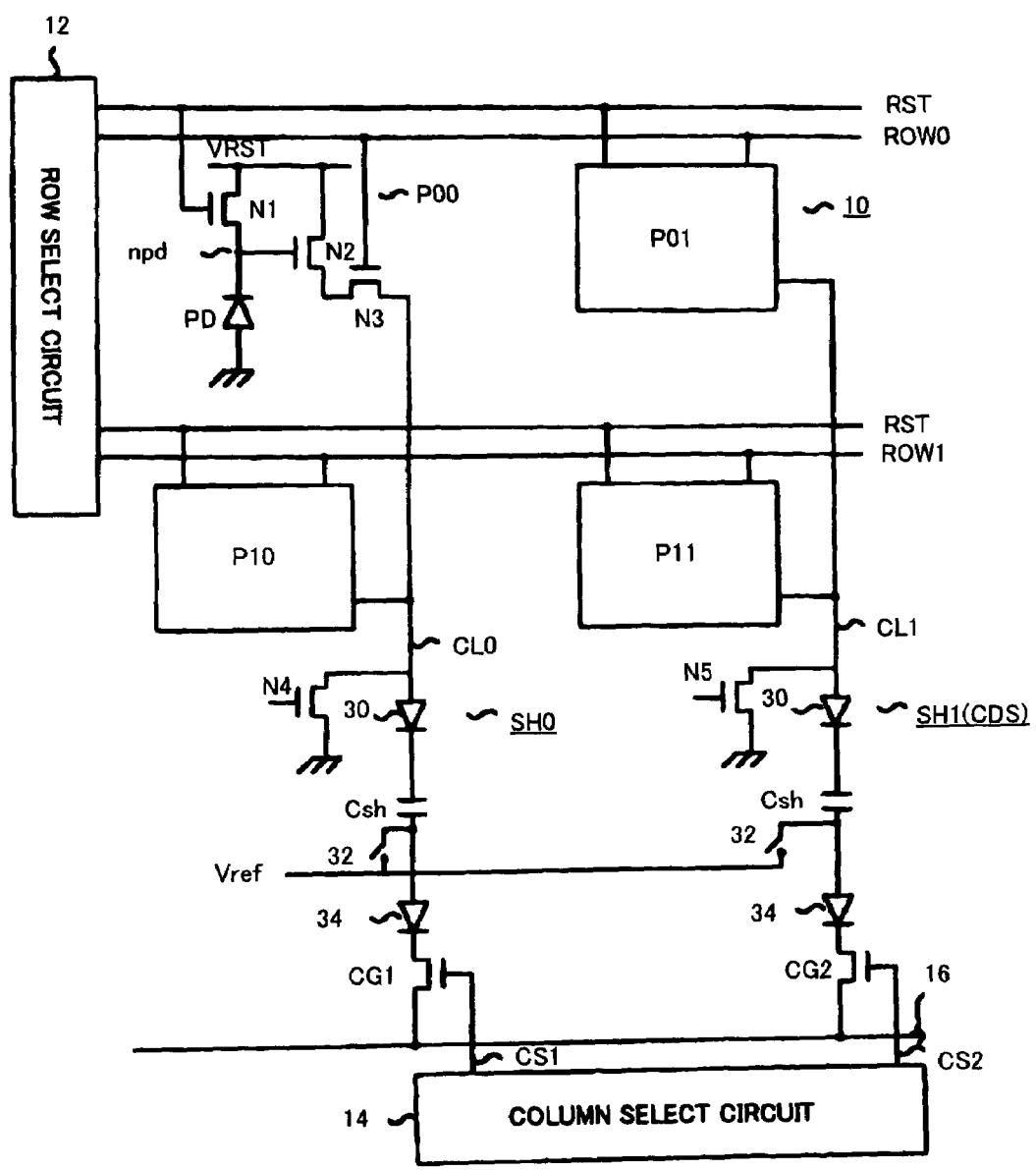
FIG. 2 is a part detail circuit diagram of a conventional CMOS image sensor.

The operation waveform diagram shown in FIG. 5 is substantially the same as the operation waveform diagram for the image sensor of the conventional example in FIG. 2. The only difference is that only the control signal ROW# for controlling the transistor N13 of the common amplifier circuit Camp is added as a control signal.

In the first embodiment of FIGS. 3, 4, the select transistor N3 is provided between the transistor N2 and the node n3. Further, when the select transistor N3 is made to conduct by the row select line, the pixel circuit PX is connected to the common amplifier circuit Camp, to thereby form an amplifying circuit. In a modified example, the select transistor N3 can also be provided between the node NA and the transistor N2. In other words, either of the node NA and the node n3 connecting the pixel circuit in parallel to the common amplifier circuit Camp could be connected to the common amplifier circuit by means of the select transistor N3. The constitution of this modified example is otherwise the same as that in FIGS. 3 and 4. However, on the common amplifier circuit Camp side too, the transistor N13 is preferably provided accordingly between the transistor N12 and the node NB.

The transistor N13 in the common amplifier circuit Camp is further provided for the sake of balance with the pixel circuit. Accordingly, so long as no obstacle presents itself with respect to the function of the differential amplifier circuit, it is also possible to dispense with the transistor N13. In such a case, a circuit design is required whereby balancing is achieved by the transistors N2, N3 and the transistor N12.

Figure 6:
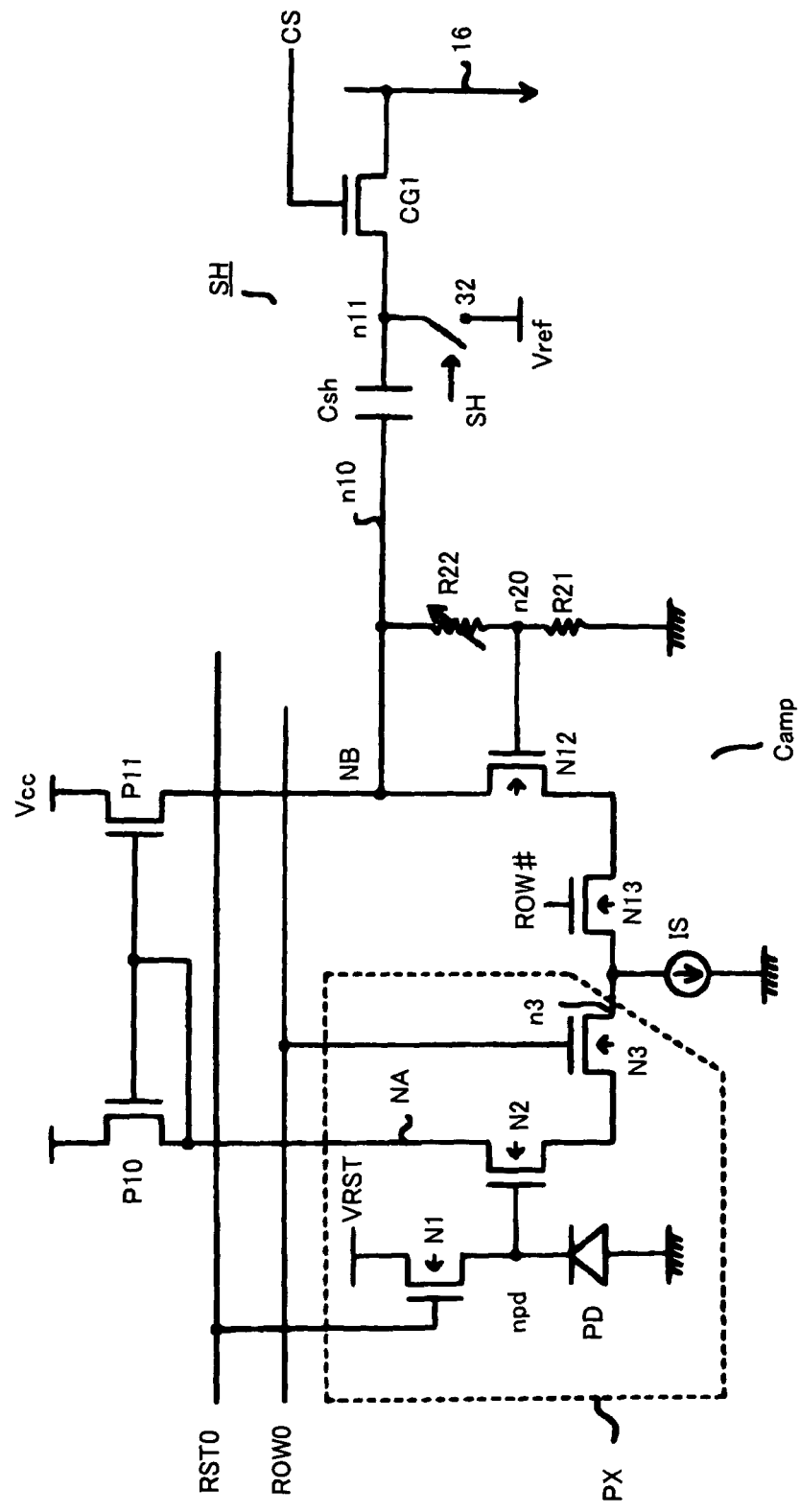
FIG. 6 shows a pixel circuit and the common amplifier circuit, according to a second embodiment.

FIG. 6 shows a pixel circuit and the common amplifier circuit, according to a second embodiment. In this figure, components which are the same as components in FIG. 3 have been assigned the same reference numerals. In the second embodiment, the amplifying circuit itself, which is formed by the pixel circuit PX and the common amplifier circuit Camp, has a gain control function. In this example too, the node NA and the node n3 of the plurality of pixel circuits are connected in parallel to the common amplifier circuit Camp. Also, the output terminal NB, which is the drain terminal of the input transistor N12 of the common amplifier circuit, is fed back negatively to the gate of the input transistor N12 via a variable resistor R22. In other words, the variable resistor R22 and the resistor R21 are connected in series between the output terminal NB and ground, and the node n20, which is the point at which these resistors connect, is connected to the gate of the input/output transistor N12.

The provision of a negative feedback circuit comprising the resistor R22 between the output NB and input n20 of such an amplifying circuit balances the amplifying circuit such that both inputs thereof are at the same potential. In other words, the differential amplifier circuit operates so that the potential of the node n20 is equal to the potential of the detection node npd and stabilizes in an equalized state. Further, the relationship between the potential of the output NB and the potential of the node n20 are determined by the ratio between the resistors R21 and R22. Thus, by varying [the resistance of] the variable resistor R22 of the negative feedback circuit, the potential of the output terminal NB can be varied and, ultimately, the gain of the amplifying circuit can be controlled. When the resistance value of the resistor R22 is large, the gain is large, and when this value is small, the gain is small. Further, because the gain of the amplifying circuit is determined by the ratio between the resistors R21 and R22, the resistor R21 can also be a variable resistor or both the resistors R21 and R22 can be variable resistors.

In the second embodiment shown in FIG. 6, the amplifying circuit formed by the pixel circuit and the common amplifier circuit is afforded a gain control function, and hence the output NB can be directly connected to the input n10 of the sample-and-hold circuit. Operation of the sample-and-hold circuit is the same as that for the first embodiment. Further, in the second embodiment, the matrix configuration of the pixel circuits is the same as the matrix configuration shown in FIG. 4. Part of the common amplifier circuit Camp in FIG. 4 could also be substituted by the common amplifier circuit Camp in FIG. 6. The operation waveform diagram is also the same as FIG. 5.

The select transistor N3 in the pixel circuit can also be provided between the transistor N2 and the node NA in the second embodiment. Further, the transistor N13 in the common amplifier circuit Camp can also be omitted for reasons similar to those of the first embodiment. The variable resistor R22 of the negative feedback circuit can also be implemented by means of a circuit in which the number of a plurality of resistive elements is suitably changed by means of a switch transistor. Alternatively, the variable resistor R22 can also be implemented by means of a circuit in which the number of a plurality of diode elements is suitably changed by means of a switch transistor. The case is similar when the resistor R21 is made a variable resistor.

In the embodiments above, pixel circuits form a matrix but the present invention is not limited to such a matrix configuration. The amplifying circuit could also be formed with the plurality of pixel circuits arranged in a one-dimensional shape, by providing the amplifying circuit so as to be common to the pixel circuits and connecting selected pixel circuits to the common amplifier circuit.

According to the present invention described hereinabove, an image sensor of high sensitivity can be provided.

What is claimed is:

1. An image sensor including a plurality of pixels, comprising:

a plurality of pixel circuits, each of which comprises a photoelectric conversion element, a first transistor to which a detection signal generated by the photoelectric conversion element is supplied, and a second transistor connected to said first transistor and controlled by a select line; and a common amplifier circuit, which is provided commonly to the plurality of pixel circuits, and which has a third transistor connected in parallel to said first transistor, and a current circuit for supplying current to said first and third transistors, wherein an amplifying circuit, which amplifies said detection signal, is formed by the first transistor in a pixel circuit selected by said select line, and by the third transistor in said common amplifier circuit, and wherein a negative feedback circuit is provided between the drain and gate of said third transistor, wherein one of a resistance of the negative feedback circuit, and a resistance between the negative feedback circuit and a reference potential, is constituted so as to be variable.

2. The image sensor according to claim 1, wherein each of said pixel circuit further comprises a reset transistor for resetting said detection signal to a reset voltage in response to a reset signal.

3. The image sensor according to claim 1, wherein said common amplifier circuit further comprises a fourth transistor connected in parallel to said second transistor.

4. The image sensor according to claim 1, wherein said second transistor is provided between the first transistor and the common amplifier circuit.

5. An image sensor including a plurality of pixels, comprising:

a plurality of pixel circuits arranged in matrix, each of which comprises a photoelectric conversion element, a first transistor to which a detection signal generated by the photoelectric conversion element is supplied, and a second transistor connected to said first transistor and controlled by a row select line; and a common amplifier circuit, which is provided commonly to a plurality of pixel circuits arranged in a column direction of the matrix, via first and second column lines, and which has a third transistor connected in parallel to said first transistor, and a current circuit for supplying current to said first and third transistors, wherein an amplifying circuit, which amplifies said detection signal, is formed by the first transistor in a pixel circuit selected by said row select line, and by the third transistor in said common amplifier circuit, and wherein a negative feedback circuit is provided between the drain and gate of said third transistor, wherein one of a resistance of the negative feedback circuit, and a resistance between the negative feedback circuit and a reference potential, is constituted so as to be variable.

6. The image sensor according to claim 5, wherein said second transistor connects said first transistor to said common amplifier circuit via said first or second column line in response to a corresponding row select line.

7. The image sensor according to claim 5, wherein said pixel circuits further comprise a reset transistor for resetting said detection signal to a reset voltage in response to a reset signal.

* * * * *